United States Patent [19]

Loveday

[11] 3,723,734
[45] Mar. 27, 1973

[54] INDICATING OR DETECTING APPARATUS FOR NUCLEAR RADIATION SUCH AS GAMMA RAYS

[75] Inventor: George Christopher Loveday, Leigh-on-Sea, England

[73] Assignee: Pye Limited, Cambridge, England

[22] Filed: Dec. 1, 1970

[21] Appl. No.: 93,946

[30] Foreign Application Priority Data

Dec. 3, 1969 Great Britain...................59,102/69

[52] U.S. Cl. .........................250/71.5 R, 250/83.3 R
[51] Int. Cl. .................................................G01t 1/20
[58] Field of Search............250/71 R, 71.5 R, 83.3 R

[56] References Cited

UNITED STATES PATENTS

| 3,594,577 | 7/1971 | Loveday | 250/83.3 R |
| 2,666,145 | 1/1954 | Eversole | 250/71.5 R |
| 3,032,657 | 5/1962 | Meier et al. | 250/71 R |
| 3,308,296 | 3/1967 | Cowan et al. | 250/71.5 R |

Primary Examiner—Walter Stolwein
Assistant Examiner—Davis L. Willis
Attorney—Beveridge & De Grandi

[57] ABSTRACT

A nuclear radiation detecting or indicating apparatus comprises a mosaic of optically separate scintillator elements which are arranged in a series of first and second elements rows respectively parallel to first and second intersecting axes, each element being in a first and in a second row; a plurality of scintillation detectors arranged to view the scintillation elements, the detectors being more widely spaced from each other than are the elements, and being arranged in first and second detector rows, parallel to the first and second element rows, each detector being in a first and a second detector row, each detecting being adapted to produce a detector pulse in response to a scintillation detected thereby, the amplitude of the pulse being dependent on the position of the scintillation relative to the detector; a respective first output channel for each first element row, and a respective second output channel for each second element row; means for summing simultaneous detector pulses from the detectors in each detector row; an analyzer for each row of detectors for analyzing the simultaneous summed detector pulses thereof into one of a plurality of amplitude ranges, each analyzer having a respective analyzer output for each amplitude range; gating means arranged to receive the outputs of the analysers and to produce simultaneous pulses in a said first and a said second output channel in response to a scintillation of brightness within a predetermined range, thereby in operation defining the element in which said scintillation occurs; the gating means comprising a plurality of logic gates, at least one pair of which is connected in common to at least two analyzer outputs, the logic gates of said at least one pair being adapted to respond differently from each other to a pulse or pulses from the analyzer outputs to which they are connected in common, so that they do not permit simultaneous pulses to occur in their respective output channels.

15 Claims, 1 Drawing Figure

PATENTED MAR 27 1973   3,723,734
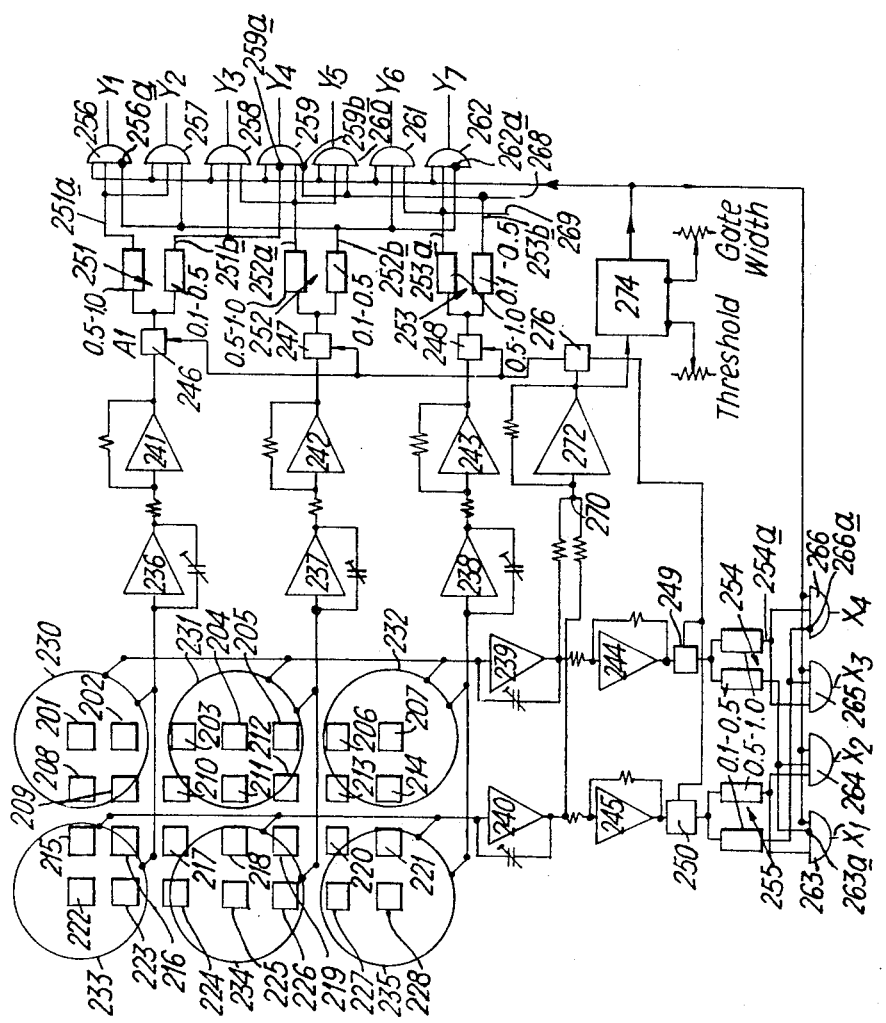
Inventor
GEORGE CHRISTOPHER LOVEDAY
By
Beveridge, DeGrandi
Attorney

INDICATING OR DETECTING APPARATUS FOR NUCLEAR RADIATION SUCH AS GAMMA RAYS

This invention relates to indicating or detecting apparatus for nuclear radiation such as for example gamma rays, which may be practically used with a crystal or phosphor producing scintillations when bombarded with such radiation.

More particularly, the invention relates to such apparatus which uses only scintillations having brightness within a predetermined range.

The invention is an improvement in or modification of the invention described and claimed in our pending U.S. Application Ser. No. 780,465, now U.S. Pat. No. 3,594,577 and provides a nuclear radiation detecting or indicating apparatus comprising a mosaic of optically separate scintillator elements which are arranged in a series of first and second element rows respectively parallel to first and second intersecting axes, each element being in a first and in a second row; a plurality of scintillation detectors arranged to view the scintillation elements, the detectors being more widely spaced from each other than are the elements, and being arranged in first and second detector rows, parallel to the first and second elements rows, each detector being in a first and a second detector row, each detector being adapted to produce a detector pulse in response to a scintillation detected thereby, the amplitude of the pulse being dependent on the position of the scintillation relative to the detector; a respective first output channel for each first element row, and a respective second output channel for each second element row; means for summing simultaneous detector pulses from the detectors in each detector row; an analyzer for each row of detectors for analyzing the simultaneous summed detector pulses thereof into one of a plurality of amplitude ranges, each analyzer having a respective analyzer output for each amplitude range; gating means arranged to receive the outputs of the analyzers and to produce simultaneous pulses in a said first and a said second output channel in response to a scintillation of brightness within a predetermined range, thereby in operation defining the element in which said scintillation occurs; the gating means comprising a plurality of logic gates, at least one pair of which are connected in common to at least two analyzer outputs, the logic gates of said at least one pair being adapted to respond differently from each other to a pulse or pulses from the analyzer outputs to which they are connected in common, so that they do not permit simultaneous pulses to occur in their respective output channels.

The gating means may comprise a logic gate for each output channel, each logic gate being connected to outputs of at least two analyzers.

At least one said logic gate may be connected to outputs of three analyzers, said analyzers being for three parallel detector rows each of which is adjacent to at least one of the other two detector rows.

The logic gates of the said pair may be functionally different from each other.

One of the logic gates of said pair may be a coincidence gate, being adapted to permit a pulse in its output channel in response to simultaneous pulses from all said analyzer outputs to which it is connected in common, the other logic gate of said pair being adapted to permit a pulse in its output channel in response to a pulse or pulses from a predetermined number only of the said analyzer outputs, to which it is connected in common.

Said at least one pair of logic gates may be connected in common to two said analyzer outputs, the said other logic gate of said pair being adapted to permit a pulse in its output channel in response to a pulse from a predetermined one only of the said two analyzer outputs.

The analyzers may be adapted to analyze the simultaneous summed detector pulses into two amplitude ranges.

The predetermined one of said analyzer outputs may correspond to the higher amplitude range of the two ranges.

There may be summing means for summing all the simultaneously occurring detector output pulses, each output channel comprising means adapted to be controlled by signals from the summing means to permit in the output channels only those pulses originating from detector pulses, the total summed amplitudes of which fall within a predetermined total amplitude range.

Said logic gates may be arranged to receive said signals from the summing means, to be controlled thereby.

There may be means for directing the output channel pulses to a core storage means or magnetic tape storage means adapted to record at a respective storage address the number of scintillations respectively produced by each scintillator element.

The first and second axes may be orthogonal.

There may be means for directing said simultaneous pulses in a first output channel and in a second output channel respectively to beam deflection means of a cathode ray tube to provide an analog display of the position of the scintillator element in which the said scintillation occurs.

Preferably, each first output channel is connected via a respective monostable to a first converter means adapted to apply to X-axis beam deflection means of the cathode ray tube an analog signal of magnitude dependent upon from which said first channel said pulse is emitted, each second output channel being connected via a respective monostable to a second converter means adapted to apply to Y-axis beam deflection means of the cathode ray tube an analog signal of magnitude dependent upon from which said second channel said pulse is emitted.

The scintillator elements may be optically screened from each other by light reflecting walls.

The invention will be described, merely by way of example, with reference to the accompanying drawing, which shows a gamma ray detecting or indicating apparatus according to the invention, in diagrammatic form.

Referring to the drawing, there is shown apparatus according to the invention, and which is in some respects similar to the apparatus described with reference to FIG. 6 of our previously mentioned specification. Therefore, the apparatus shown in the drawing accompanying this specification will be described in detail only with regard to those respects in which it differs from that apparatus, which hereinafter is referred to as the "FIG. 6 apparatus."

Dealing first briefly with those parts of the apparatus common also to the FIG. 6 apparatus, there is provided a mosaic of scintillator elements 201 to 228, arranged in four first rows which are parallel to each other, and seven second rows which are also parallel to each other. Each scintillator element is disposed in both a first and a second row and has an exposed surface or window of about 5 mm. square. It will be appreciated that in practice there are many more elements (e.g., 1,500) than are shown in the drawing and they are also much more closely spaced from each other, the wide spacing being used in the drawing for clarity. The scintillator elements are screened from each other by a suitable metal screen with a packing of alumina or the like between the screen and its scintillator element, to give a light reflecting surface. The screen is of a dense metal to reduce the possibility of Compton scatter between elements.

Above the mosaic of scintillator elements are positioned six scintillation detectors or photo-multiplier tubes 230 to 235, a light pipe being disposed between the elements 201 to 228 and the detectors, to prevent undue light scatter. The field of view of each scintillation detector extends over a plurality of the scintillator elements, and overlaps the field of view of neighboring detectors. Again, it will be appreciated that in practice many more detectors (e.g., 70) are provided, six only being shown in the interests of clarity. The detectors are arranged in parallel first rows and parallel second rows, respectively parallel to the first and second rows of scintillator elements, each detector being in a first and a second row.

The outputs of the detectors in each row are summed by being taken via a line common to the detectors in each row to a respective charge sensitive amplifier 236 to 240. For example, the detectors 230, 231, 232, falling in a first row, have their outputs summed in a common line leading to the charge sensitive amplifier 239. The output of each charge sensitive amplifier 236 to 240 is taken via a respective voltage amplifier 241 to 245 and a respective pulse-shaping circuit 246 to 250 to respective pulse height analyzers 251 to 255. These analyzers differ from the similarly referenced analyzers of the FIG. 6 apparatus in that they analyze the summed output pulses of the detectors in each row into only two amplitude ranges, instead of three.

The spacing of the scintillator elements, and the field of view of the detectors, which are more widely spaced from each other than are the scintillator elements, is such that, for example with reference to the rows of detectors (230, 233) and (231, 234), a scintillation of brightness within a predetermined range in one of the elements 201, 208, 215, 222 causes the analyzer 251 to produce an output in its higher amplitude range channel 251a. No output is produced in either channel of the analyzer 252, relating to the adjacent row of detectors 231, 234. A scintillation in one of the elements 202, 209, 216, 223 produces an output from the analyzer 251 in its higher-range channel 251a, and an output from the analyzer 252 in its lower-range channel 252b. Analogously, a scintillation in one of the elements 203, 210, 217 224 produces analyzer outputs in the low-range 251b of the analyzer 251, and in one of the elements 204, 211, 218, 225 produces an output in the high-range channel 252a only of the analyzer 252, and no output whatever in either channel of the analyzer 251.

The analyzers each produce a low-range output in response to a respective pulse from a row of detectors of between 0.1 and 0.5 volts, and produce a high-range output in response to a pulse of 0.5 to 1.0 volts.

Gating means comprising logic gates 256 to 266 are provided to control the emission of pulses in output channels $X_1$ to $X_4$ and $Y_1$ to $Y_7$. Each X channel corresponds to one of the first rows of elements, and each Y channel corresponds to one of the second rows of elements. Thus, simultaneously occurring pulses in a first (X) channel and a second (Y) channel defines the element in which the scintillation producing the pulses occurred.

Each logic gate is connected to at least two analyzer output channels, one each from analyzers for adjacent rows of detectors. Thus, for example, logic gate 256 is arranged to receive an analyzer output from the analyzer 251, and from the analyzer 252. The logic gate 259 is arranged to receive an analyzer output from the analyzers 251, 252 and 253. It will be seen that these analyzers are for three parallel rows of detectors each of which is adjacent to at least one of the other two detector rows. Each of the logic gates 256 to 266 controls a respective output channel for an element row viewed by at least one of the adjacent detector rows, from the analyzers of which the gate receives outputs.

From the drawing, it will be seen that some logic gates form pairs in that they are connected in common to the same two analyzer outputs. The logic gates of each pair are adapted to respond differently from each other in response to a pulse or pulses from the analyzer outputs to which they are connected in common. In each pair of logic gates, one of the logic gates in this embodiment is functionally different from the other logic gate of the pair, so that they do not permit simultaneous pulses to occur in the respective output channels which they control. If two logic gates of the same functional type were connected to the same two analyzer outputs, then pulses would be produced simultaneously in two parallel output channels, and one of such output pulses would be spurious.

Thus, for example, the logic gates 256 and 257 are both connected to the analyzer outputs 251a and 252b. However, whereas the logic gate 257 is a coincidence gate, and permits a pulse to occur in its output channel $Y_2$ in response to simultaneous pulses from both the analyzer outputs 251a and 252b, the logic gate 256 is such as to permit a pulse in its output channel $Y_1$ only in response to a pulse from the analyzer output channel 251a alone. This is because the analyzer output 252b is connected to an inhibit terminal 256a of the gate 256, so that if a pulse is provided in the analyzer output 252b simultaneously with a pulse in the analyzer output 251a, the gate 256 does not conduct. Thus, an output pulse in the channel $Y_1$ is produced only in response to a scintillation in one of the elements 201, 208, 215, 222.

The logic gate 257 produces an output pulse in its output channel $Y_2$ when it receives simultaneous analyzer output pulses from the analyzer outputs 251a and 252b; that is to say, it produces an output pulse only when the scintillation occurs in one of the elements 202, 209, 216, or 223.

The logic gates 258, 260, 261 are coincidence gates of the same type as the logic gate 257, and the logic gates 259 and 262 are gates of basically the same type as the logic gate 256, having respective inhibit terminals 259a and 262a. The logic gate 259 differs somewhat in having an extra inhibit terminal 259b.

A scintillation in one of the elements 203, 210, 217 or 224 produces analyzer outputs in the analyzer output channels 252a and 251b. Thus an output pulse is provided in the output channel $Y_3$, but no pulse is provided in the channel $Y_4$, since the gate 259 receives an inhibit signal from the analyzer output channel 251b.

A scintillation in one of the elements 204, 211, 218 or 225 produces an analyzer output in the analyzer output channel 252a only, and thus an output pulse is provided in channel $Y_4$.

A scintillation in one of the elements 205, 212, 219, 226 produces an output in the analyzer output channels 252a and 253b. An output pulse is thus provided in the output channel $Y_5$, but not in the output channel $Y_4$ since the gate 259 receives an inhibit signal at its extra inhibit terminal 259b.

The logic gates 264 and 265 associated with the output channels $X_2$, $X_3$ are coincidence gates of the same type as the gate 257, whereas the logic gates 263, 266 are gates of the same type as the logic gate 256, having inhibit terminals 263a, 266a respectively.

Thus, for example, a scintillation in one of the elements 208 to 214 produces outputs in the high-range output channel 254a of the analyzer 254, and in the low-range output channel 255b of the analyzer 255. These analyzer outputs are fed to both the gates 265 and 266 but only the former gate permits a pulse in its output channel $X_3$.

The operation of the logic gates in response to a scintillation in any one of the other elements can be deduced from the drawing, and by analogy from the foregoing description.

The free connections 268, 269 are provided to make it clear that the number of elements, the number of detector rows, and the number of logic gates can be expanded greatly to provide more Y output channels, the connections 268, 269 respectively being connected to logic gates equivalent to the logic gates 261, 260. A similar expansion can be made parallel to the X axis, to provide more X output channels.

When the apparatus is expanded in this way, then with this particular relative spacing of the elements and the detectors, the logic gates controlling output channels corresponding to element rows (e.g., 204, 211, 218, 225) directly under detector rows (e.g., 231, 234) which are not at the edges of the array of detector rows, should be of the same type as the logic gate 259, that is to say, with an extra inhibit terminal permitting the gate to distinguish between inhibit signals from adjacent detector rows in positions corresponding to those of the rows 230, 233 and 232, 235.

It will be appreciated however that the provision of logic gates such as 259, connected to outputs of analyzers for three parallel adjacent rows of detectors, is due to the particular relative spacing of the elements and the detectors, and the gate widths of the pulse height analyzers. Changes in these parameters may require more or less logic gates which are connected in common to outputs of more than two analyzers for adjacent detector rows.

Compared to the FIG. 6 apparatus, the apparatus herein specifically described by way of example employs only two-level analyzers 251, 252, 253 which may result in lower cost and/or higher reliability.

As in the FIG. 6 apparatus, the summed outputs of the detector rows 230, 231, 232 and, 233, 234, 235 are summed at a summing junction 270, which is connected to the outputs of the charge sensitive amplifiers 239, 240. This summing junction thus sums all the detector pulses occurring simultaneously. The summed detector pulses are fed via an amplifier 272 to a single channel analyzer 274 and a monostable 276. The single channel analyzer produces an output signal only if the total summed amplitude of the detector pulses falls within a predetermined total amplitude range corresponding to a scintillation of brightness within a predetermined range, such as produced by a gamma radiation of a selected energy level.

Each of the logic gates 256 to 266 have another input terminal to which the output signal of the single channel analyzer 274 is fed. Each of the gates 256 to 266 is such that it will only produce an output when an input signal is present at its said another input terminal. Thus, spurious output signals due to scintillations produced by stray radiations not of a selected energy level are avoided, or at least reduced.

The monostable 276 produces pulses which are fed to the pulse shaping circuits 246 to 250 to control the operation thereof. The pulse shaping circuits ensure that the pulses received by the pulse-height analyzers are of a consistent shape, despite the slight variations in the pulses produced by different detectors.

It will be appreciated that the output channels $X_1$ to $X_4$ and $Y_1$ to $Y_7$ may be fed to the X and Y deflection mans of a cathode ray tube to provide an analog display of the position of the scintillator element in which the scintillation occurs. Thus, each first (X) output channel is connected via a respective monostable to a first converter means adapted to apply to the X deflection means an analog signal of magnitude dependent upon from which said first channel said pulse is emitted, each second output channel being connected via a respective monostable to a second converter means adapted to apply to the Y deflection means an analog signal of magnitude dependent upon from which said second channel said pulse is emitted. Full details of a suitable arrangement for effecting this are given on our previously mentioned specification, with reference to FIG. 5 thereof.

Alternatively or in addition, as also described in that specification, the output channel pulses may be directed to a core store or a magnetic tape store to record at a respective storage address the number of scintillations respectively produced by each scintillator element. The number of scintillations produced by each scintillator element is of course indicative of the total radiation detected thereby.

Reference may be had to our previously mentioned specification for a full description of those parts of the apparatus herein disclosed which are also common to the apparatus disclosed in that application. Also, any modifications described in that application may if suitable be incorporated in the apparatus of the present invention.

I claim:

1. In a nuclear radiation detecting or indicating apparatus comprising a mosaic of optically separate scintillator elements which are arranged in a series of first and second element rows respectively parallel to first and second intersecting axes, each element being in a first and in a second row; a plurality of scintillation detectors arranged to view the scintillation elements, the detectors being more widely spaced from each other than are the elements, and being arranged in first and second detector rows, parallel to the first and second element rows, each detector being in a first and a second detector row, each detector being adapted to produce a detector pulse in response to a scintillation detected thereby, the amplitude of the pulse being dependent on the position of the scintillation relative to the detector; a respective first output channel for each first element row, and a respective second output channel for each second element row; means for summing simultaneous detector pulses from the detectors in each detector row; an analyzer for each row of detectors for analyzing the simultaneous summed detector pulses thereof into one of a plurality of amplitude ranges, each analyzer having a respective analyzer output for each amplitude range; gating means arranged to receive the outputs of the analyzers and to produce simultaneous pulses in a said first and a said second output channel in response to a scintillation of brightness within a predetermined range, thereby in operation defining the element in which said scintillation occurs; the gating means comprising a plurality of logic gates, at least one pair of which are connected in common to at least two analyzer outputs, the improvement comprising the logic gates of said at least one pair being responsive differently from each other to a pulse or pulses from the analyzer outputs to which they are connected in common, so that they do not permit simultaneous pulses to occur in their respective output channels.

2. Apparatus as claimed in claim 1 wherein the gating means comprises a logic gate for each output channel, each logic gate being connected to outputs of at least two analyzers.

3. Apparatus as claimed in claim 2 wherein at least one said logic gate is connected to outputs of three analyzers, said analyzers being for three parallel detector rows each of which is adjacent to at least one of the other two detector rows.

4. Apparatus as claimed in claim 1 wherein the logic gates of the said pair are functionally different from each other.

5. Apparatus as claimed in claim 4 wherein one of the logic gates of said pair is a coincidence gate, comprising means to permit a pulse in its output channel in response to simultaneous pulses from all said analyzer outputs to which it is connected in common, the other logic gate of said pair comprising means to permit a pulse in its output channel in response to a pulse or pulses from a predetermined number only of the said analyzer outputs, to which it is connected in common.

6. Apparatus as claimed in claim 5 wherein said at least one pair of logic gates are connected in common to two said analyzer outputs, the said other logic gate of said pair being adapted to permit a pulse in its output channel in response to a pulse from a predetermined one only of the said two analyzer outputs.

7. Apparatus as claimed in claim 6 wherein the analyzers comprise means to analyze the simultaneous summed detector pulses into two amplitude ranges, the predetermined one of said analyzer outputs corresponding to the higher amplitude range of the two ranges.

8. Apparatus as claimed in claim 1 wherein the analyzers comprise means to analyze the simultaneous summed detector pulses into two amplitude ranges.

9. Apparatus as claimed in claim 1 comprising summing means for summing all the simultaneously occurring detector output pulses, each output channel comprising means controlled by signals from the summing means to permit in the output channels only those pulses originating from detector pulses, the total summed amplitudes of which fall within a predetermined total amplitude range.

10. Apparatus as claimed in claim 9 wherein said logic gates are arranged to receive said signals from the summing means, to be controlled thereby.

11. Apparatus as claimed in claim 1 comprising means for directing the output channel pulses to a core storage means or magnetic tape storage means adapted to record at a respective storage address the number of scintillations respectively produced by each scintillator element.

12. Apparatus as claimed in claim 1 wherein the first and second axes are orthogonal.

13. Apparatus as claimed in claim 1 comprising a cathode ray tube and means for directing said simultaneous pulses in a first output channel and in a second output channel respectively to beam deflection means of the cathode ray tube to provide an analog display of the position of the scintillator element in which the said scintillation occurs.

14. Apparatus as claimed in claim 13 wherein the first and second axes are orthogonal, each first output channel being connected via a respective monostable to a first converter means adapted to apply to X-axis beam deflection means of the cathode ray tube an analog signal of magnitude dependent upon from which said first channel said pulse is emitted, each second output channel being connected via a respective monostable to a second converter means adapted to apply to Y-axis beam deflection means of the cathode ray tube an analog signal of magnitude dependent upon from which said second channel said pulse is emitted.

15. Apparatus as claimed in claim 1 wherein the scintillator elements are optically screened from each other by light reflecting walls.

* * * * *